(12) United States Patent
Simmons et al.

(10) Patent No.: US 10,684,016 B2
(45) Date of Patent: Jun. 16, 2020

(54) AFT FRAME ASSEMBLY FOR GAS TURBINE TRANSITION PIECE

(71) Applicant: General Electric Company, Schenectady, NY (US)

(72) Inventors: Scott Robert Simmons, Greenville, SC (US); Ronald James Chila, Greenfield Center, NY (US); Kevin Weston McMahan, Greenville, SC (US); Wei Chen, Glastonbury, CT (US); Charles Lewis Davis, III, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 15/783,291

(22) Filed: Oct. 13, 2017

(65) Prior Publication Data

US 2019/0113230 A1 Apr. 18, 2019

(51) Int. Cl.
*F02C 7/18* (2006.01)
*F23R 3/04* (2006.01)
(Continued)

(52) U.S. Cl.
CPC ............... *F23R 3/04* (2013.01); *F01D 5/186* (2013.01); *F01D 9/023* (2013.01); *F01D 25/12* (2013.01);
(Continued)

(58) Field of Classification Search
None
See application file for complete search history.

(56) References Cited

U.S. PATENT DOCUMENTS 6,412,268 B1 * 7/2002 Cromer ............... F01D 9/023
60/760
6,546,627 B1 * 4/2003 Sekihara ............... B23P 6/005
29/402.08
(Continued)

FOREIGN PATENT DOCUMENTS

EP 2353763 A1 8/2011
EP 2500523 A2 9/2012
(Continued)

OTHER PUBLICATIONS

General Electric Company; Extended Search Report for European Patent Application No. 18198359; dated Feb. 12, 2019; (2 pages).

*Primary Examiner* — Gerald L Sung
*Assistant Examiner* — Marc J Amar
(74) *Attorney, Agent, or Firm* — Dority & Manning, P.A.

(57) ABSTRACT

An aft frame assembly for a gas turbine transition piece has a main body with an upstream facing surface, a downstream facing surface, a radially outer facing surface and a radially inner facing surface. A plurality of feed hole inlets are located on the upstream facing surface. Each of the feed hole inlets are coupled to one of a plurality of cooling channels passing through the main body towards the radially inner facing surface. A plurality of microchannels are formed near the radially inner facing surface and extend at least partially along the downstream facing surface. The cooling channels are connected to and terminate in the microchannels. A pre-sintered preform is located on the radially inner facing surface of the main body.

17 Claims, 9 Drawing Sheets

(51) Int. Cl.
*F01D 9/02* (2006.01)
*F01D 25/12* (2006.01)
*F01D 5/18* (2006.01)
*F23R 3/02* (2006.01)

(52) U.S. Cl.
CPC ............... *F02C 7/18* (2013.01); *F23R 3/02* (2013.01); *F05D 2220/32* (2013.01); *F05D 2230/22* (2013.01); *F05D 2230/90* (2013.01); *F05D 2260/201* (2013.01); *F05D 2260/204* (2013.01)

(56) References Cited

U.S. PATENT DOCUMENTS

| | | | |
|---|---|---|---|
| 8,245,515 B2 | 8/2012 | Davis | |
| 8,499,566 B2 | 8/2013 | Lacy | |
| 8,651,805 B2* | 2/2014 | Lacy | F01D 5/186 415/178 |
| 8,956,104 B2 | 2/2015 | Lacy | |
| 9,255,484 B2* | 2/2016 | Cihlar | F01D 9/023 |
| 9,297,262 B2 | 3/2016 | Zhang | |
| 9,574,498 B2 | 2/2017 | Fadde | |
| 10,072,515 B2* | 9/2018 | Fleuriot | F01D 9/023 |
| 2001/0037646 A1* | 11/2001 | Shimizu | F01D 9/023 60/752 |
| 2002/0112483 A1* | 8/2002 | Kondo | F01D 9/023 60/796 |
| 2009/0324387 A1* | 12/2009 | Turaga | F01D 9/023 415/115 |
| 2010/0003128 A1* | 1/2010 | Chila | F01D 9/023 415/182.1 |
| 2010/0034643 A1* | 2/2010 | Davis, Jr. | F01D 9/023 415/144 |
| 2011/0162378 A1* | 7/2011 | Chila | F01D 9/023 60/752 |
| 2012/0036858 A1 | 2/2012 | Lacy | |
| 2012/0210720 A1* | 8/2012 | McMahan | F01D 9/023 60/760 |
| 2012/0234018 A1* | 9/2012 | Cihlar | F01D 9/023 60/796 |
| 2012/0308843 A1* | 12/2012 | Ott | B23K 1/0018 428/614 |
| 2014/0000267 A1* | 1/2014 | Melton | F01D 9/023 60/752 |
| 2014/0360155 A1* | 12/2014 | Weber | F01D 5/187 60/39.83 |
| 2015/0082795 A1* | 3/2015 | Fadde | F02C 7/141 60/734 |
| 2015/0369068 A1* | 12/2015 | Kottilingam | B22F 7/08 415/116 |
| 2018/0051578 A1* | 2/2018 | Marlow | F01D 9/023 |
| 2018/0100436 A1* | 4/2018 | DiCintio | F01D 9/023 |

FOREIGN PATENT DOCUMENTS

EP 2876260 A1 5/2015
WO 2017105405 A1 6/2017

* cited by examiner

AFT FRAME ASSEMBLY FOR GAS TURBINE TRANSITION PIECE

BACKGROUND OF THE INVENTION

The apparatus described herein relates generally to aft frame assemblies, and more specifically, to an aft frame assembly for a transition piece of a gas turbine where the aft frame assembly includes microchannel cooling slots.

Turbine systems are widely utilized in fields such as power generation. For example, a conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

In a typical arrangement, an annular array of combustors is connected to the first stage of the turbine by a plurality of transition pieces. The transition pieces are each shaped at one end to conform to respective combustor liners, and at an opposite end to conform to the inlet of the turbine. Thus, at the opposite (or downstream) end, a transition piece has an aft frame by which the transition piece is secured to the turbine. An impingement sleeve may surround the transition duct, and may be used to direct working fluid discharged from the compressor into contact with the transition piece. This working fluid eventually mixes with the fuel in the combustor.

Currently, some of the working fluid that enters the flow path between the transition piece and the surrounding impingement sleeve is removed through holes in the aft frame. This working fluid, which is used to cool the aft frame, dumps into the hot gas from the combustor just before the hot gas enters the turbine. The problem with this current cooling method is that this working fluid does not always reach the areas of the aft frame that need to be cooled. In the past the downstream face and downstream corners of the aft frame have been insufficiently cooled, due to the difficulty in cooling these areas.

BRIEF DESCRIPTION OF THE INVENTION

In an aspect of the present invention, an aft frame assembly for a gas turbine transition piece has a main body with an upstream facing surface, a downstream facing surface, a radially outer facing surface and a radially inner facing surface. A plurality of feed hole inlets are located on the upstream facing surface. Each of the feed hole inlets are coupled to one of a plurality of cooling channels passing through the main body towards the radially inner facing surface. A plurality of microchannels are formed near the radially inner facing surface and extend at least partially along the downstream facing surface. The cooling channels are connected to and terminate in the microchannels. A pre-sintered preform is located on the radially inner facing surface of the main body.

In another aspect of the present invention, a transition piece assembly having an aft frame assembly is provided. The aft frame assembly includes a main body having an upstream facing surface, a downstream facing surface, a radially outer facing surface and a radially inner facing surface. A plurality of feed hole inlets are located on the upstream facing surface. Each of the feed hole inlets are coupled to one of a plurality of cooling channels passing through the main body towards the radially inner facing surface. A plurality of microchannels are formed near the radially inner facing surface and extend at least partially along the downstream facing surface. The cooling channels are connected to and terminate in the microchannels. A pre-sintered preform is located on the radially inner facing surface of the main body. The plurality of microchannels are formed in the main body or the pre-sintered preform.

In yet another aspect of the present invention, a gas turbine includes a compressor and a combustion section disposed downstream from the compressor. The combustion section is in fluid communication with the compressor. A turbine is disposed downstream from the combustion section. The combustion section includes an aft frame assembly having a main body with an upstream facing surface, a downstream facing surface, a radially outer facing surface and a radially inner facing surface. A plurality of feed hole inlets are located on the upstream facing surface, and each of the feed hole inlets are coupled to one of a plurality of cooling channels passing through the main body towards the radially inner facing surface. A plurality of microchannels are formed near the radially inner facing surface and extend at least partially along the downstream facing surface. The cooling channels are connected to and terminating in the microchannels. A pre-sintered preform is located on the radially inner facing surface of the main body. The plurality of microchannels are formed in the main body or the pre-sintered preform.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component, and perpendicular to the radial direction.

Figure 1:
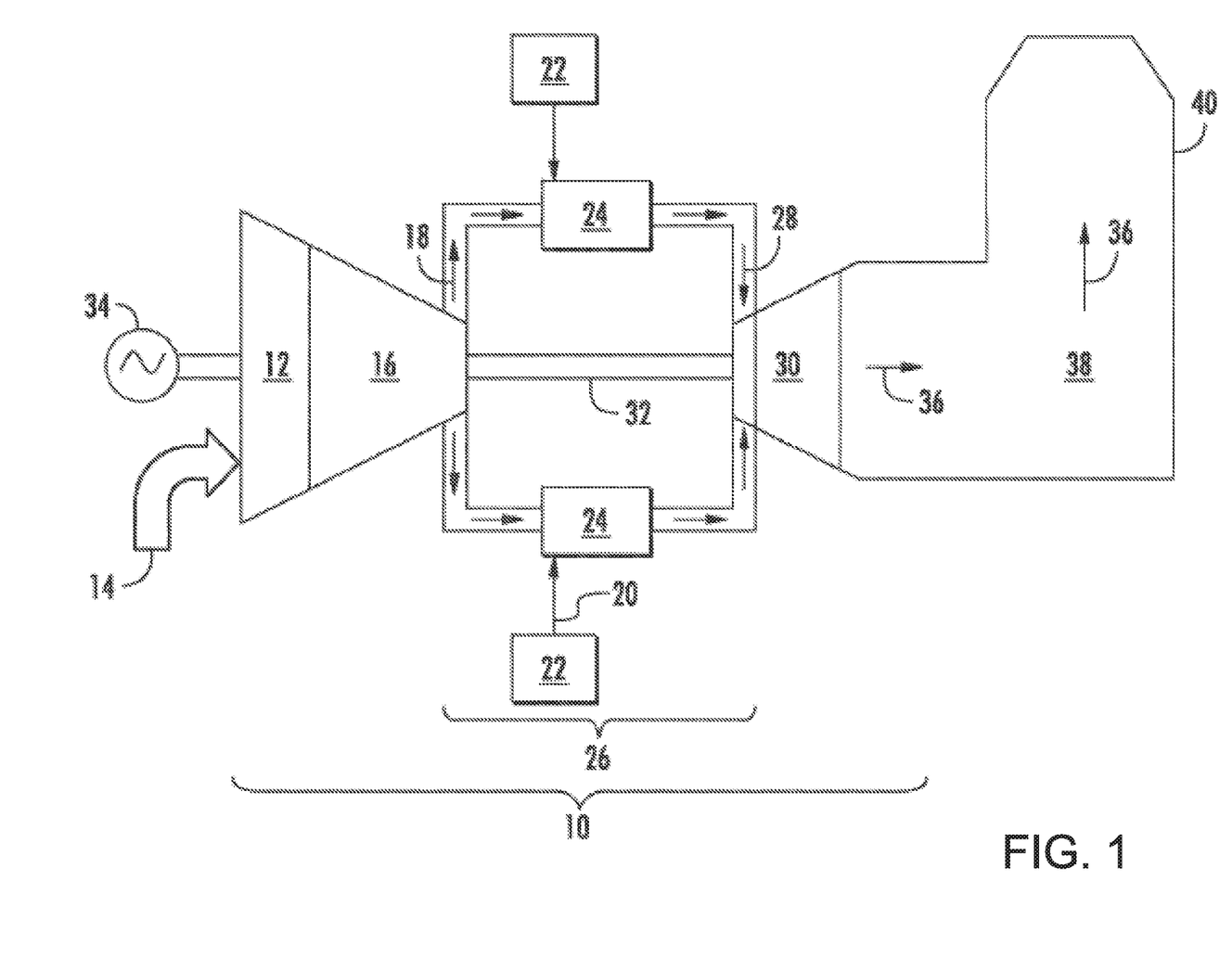
FIG. 1 is a functional block diagram of an exemplary gas turbine.

Referring now to the drawings, wherein identical numerals indicate the same elements throughout the figures, FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24 of a combustion section 26 of the gas turbine 10. The combustible mixture is burned to produce combustion gases 28 having a high temperature, pressure and velocity. The combustion gases 28 flow through a turbine 30 of a turbine section to produce work. For example, the turbine 30 may be connected to a shaft 32 so that rotation of the turbine 30 drives the compressor 16 to produce the compressed working fluid 18.

Alternately or in addition, the shaft 32 may connect the turbine 30 to a generator 34 for producing electricity. Exhaust gases 36 from the turbine 30 flow through an exhaust section 38 that connects the turbine 30 to an exhaust stack 40 downstream from the turbine 30. The exhaust section 38 may include, for example, a heat recovery steam generator (not shown) for cleaning and extracting additional heat from the exhaust gases 36 prior to release to the environment.

Figure 2:
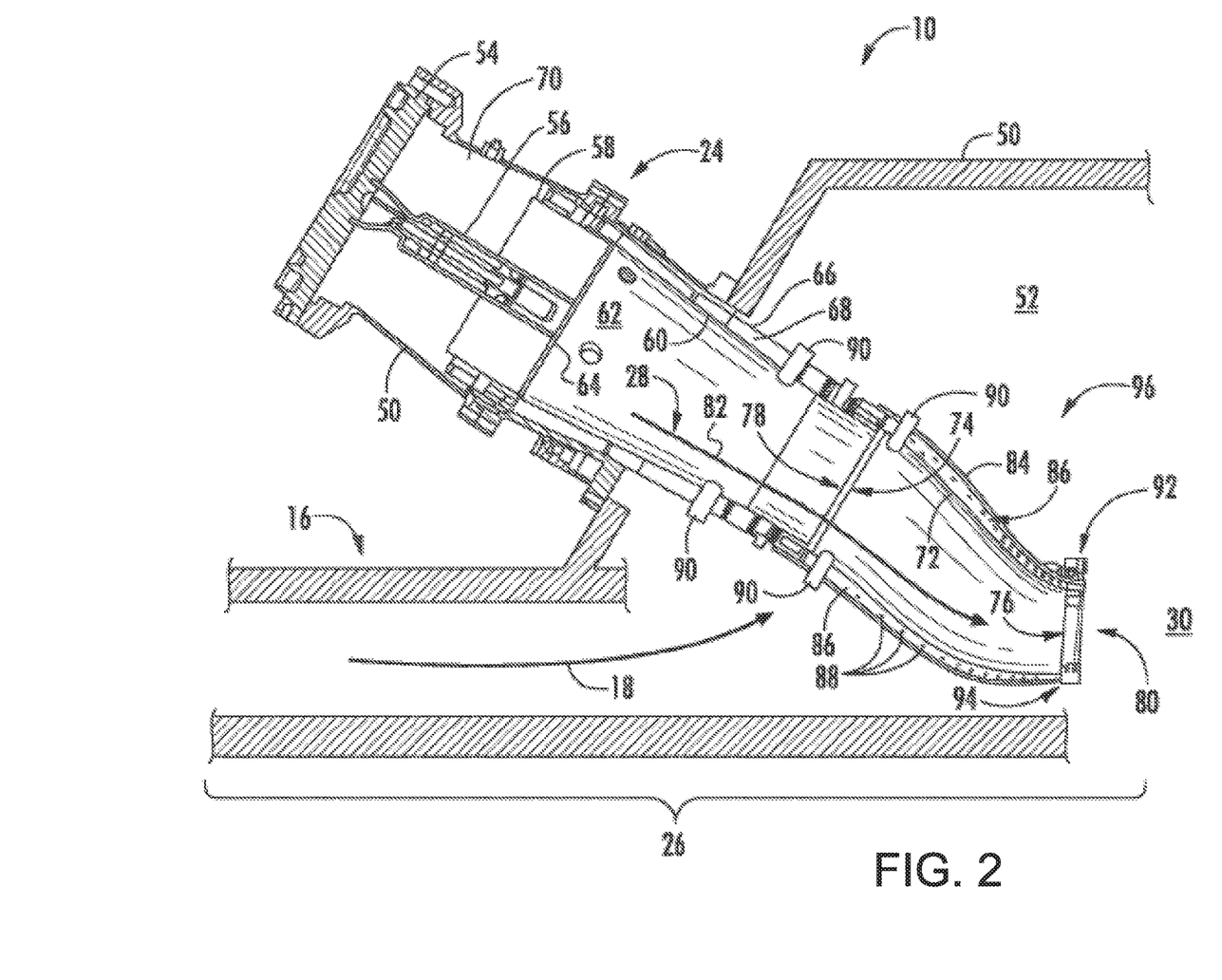
FIG. 2 illustrates a cross sectional side view of a portion of a gas turbine, including a combustor that may encompass various aspects of the present disclosure.

FIG. 2 provides a cross sectional side view of a portion of the gas turbine 10 including an exemplary combustor 24 as may be incorporated in various embodiments of the present invention. As shown in FIG. 2, the combustion section 26 includes an outer casing 50, such as a compressor discharge casing, disposed downstream from the compressor 16. The outer casing 50 at least partially surrounds the combustor 24. The outer casing 50 at least partially defines a high pressure plenum 52 that at least partially surrounds the combustor 24. The high pressure plenum 52 is in fluid communication with the compressor 16 so as to receive the compressed working fluid 18 from the compressor 16 during operation of the gas turbine 10.

An end cover 54 may be connected to the outer casing 50. In particular combustor designs, the end cover 54 is in fluid communication with the fuel source 22. A fuel nozzle 56 in fluid communication with the end cover 54 and/or the fuel source 22 extends downstream from the end cover 54. The fuel nozzle 56 extends generally axially through an annular cap assembly 58 disposed within the outer casing 50. An annular liner 60 such as a combustion liner or transition duct at least partially defines a combustion chamber 62 within the combustor 24 downstream from an outlet end 64 of the fuel nozzle 56. A flow sleeve 66 may circumferentially surround at least a portion of the liner 60. The flow sleeve 66 is radially separated from the liner 60 so as to define a flow passage 68 therebetween. The flow passage 68 is in fluid communication with the combustion chamber 62 via a head end portion 70 of the combustor 24. The head end portion 70 may be at least partially defined by the end cover 54 and/or the outer casing 50.

A transition duct (or transition piece) 72 extends downstream from the combustion chamber 62. The transition duct 72 includes an upstream end 74 that is axially separated from a downstream end 76. In particular configurations, the upstream end 74 surrounds a downstream portion 78 of the annular liner 60. The downstream end 76 of the transition duct 72 terminates proximate to an inlet 80 of the turbine 30. The annular liner 60 and/or the transition duct 72 at least partially define a hot gas path 82 for routing the combustion gases 28 from the combustion chamber 62 through the high pressure plenum 52 and into the turbine 30.

An outer sleeve 84 such as an impingement or flow sleeve extends circumferentially around the transition duct 72. The outer sleeve 84 is radially separated from the transition duct 72 to define a cooling annulus 86 therebetween. The outer sleeve 84 may include a plurality of cooling holes 88 or passages that provide for fluid communication between the high pressure plenum 52 and the cooling annulus 86. In one embodiment, the cooling annulus 86 is in fluid communication with the combustion chamber 62.

One or more fuel injectors 90, also commonly known as late lean fuel injectors, may extend through the outer sleeve 84, the cooling annulus 86 and the transition duct 72 to provide for fuel injection into the hot gas path 82 downstream from the combustion chamber 62. The fuel injectors 90 may extend through the flow sleeve 66, the flow passage 68 and the liner 60 to provide for fuel injection into the hot gas path 82 downstream from the combustion chamber 62. Other penetrations such as cross fire tubes, igniters, pressure probes and flame detectors may act as bluff bodies within the flow annulus 86, thus creating disturbances to the flow such as wakes.

An aft frame assembly (or aft frame) 92 is disposed at or proximate to the downstream end 76 of the transition duct 72. The aft frame 92 is integral with the downstream end 76 of the transition duct 72. A portion of the outer sleeve 84 such as a forward edge 94 may be integral or connected to the aft frame 92 to at least partially define the cooling annulus 86. The aft frame 92 and the transition duct 72 may be manufactured as a singular component. In the alternative, the aft frame 92 may be connected to the transition duct 72 via welding, brazing or any other suitable process. In one embodiment, the transition duct 72, the outer sleeve 84, the cooling annulus 86 and the aft frame 92 are provided as a transition piece assembly 96. The aft frame 92 generally provides structural support to reduce and/or prevent deformation of the downstream end 76 of the transition duct 72 during operation of the combustor. The aft frame 92 may provide a means for mounting the transition duct 72 within the outer casing 50.

Figure 3:
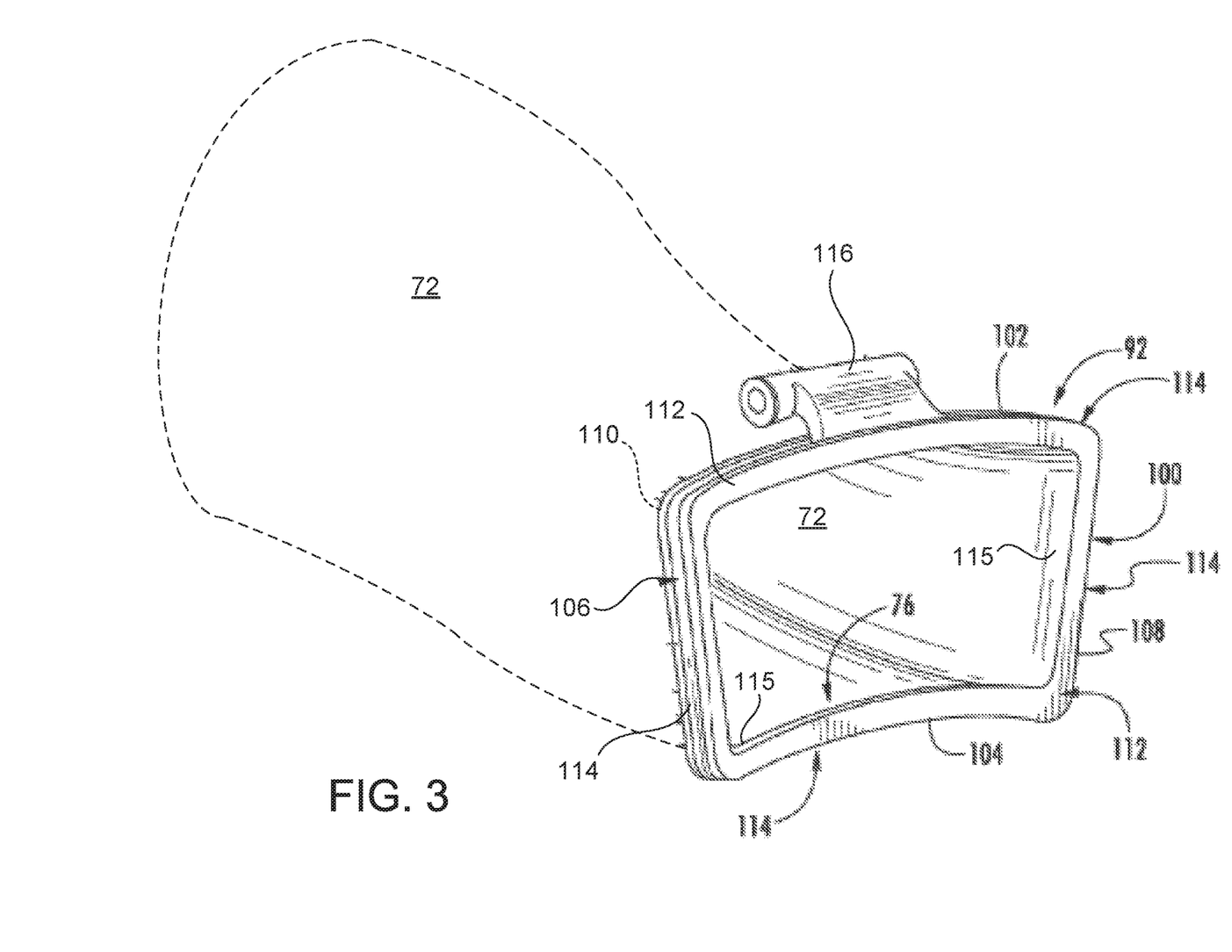
FIG. 3 illustrates a perspective view of an aft frame of the combustor as shown in FIG. 2, according to an aspect of the present disclosure.

As shown in FIG. 3, the aft frame 92 comprises a main body 100. The main body 100 includes an outer (or top) rail 102, an inner (or bottom) rail 104 and a first side rail 106 that is circumferentially separated from an opposing second side rail 108. The side rails are located on the sides of the aft frame, the outer rail is located on the top of the aft frame, and the inner rail is located on the bottom of the aft frame. Top rail 102 is located radially outward of bottom rail 104. The main body 100 further includes an upstream facing surface 110 (not visible in FIG. 3) separated from (and opposed to) a downstream facing surface 112, and a radially outer facing surface 114 that extends around an outer perimeter of the main body 100 at least partially between the upstream facing surface 110 and the downstream facing surface 112, and a radially inner facing surface 115 that extends around an inner perimeter of the main body 100 at least partially between the upstream facing surface 110 and the downstream facing surface 112. The aft frame 92 may also include a mounting feature 116 for mounting the transition piece 72 and/or the transition piece assembly 96 (FIG. 2) within the gas turbine 10.

The side rails of the aft frame have unique cooling needs due to the transition from a "can" combustor to an "annular" hot gas path where the inner and outer rails match up to the hot gas path. However, the side rails of the aft frame have no corresponding part in the hot gas path and therefore are exposed to hot gases more directly than the inner and outer rails.

Figure 4:
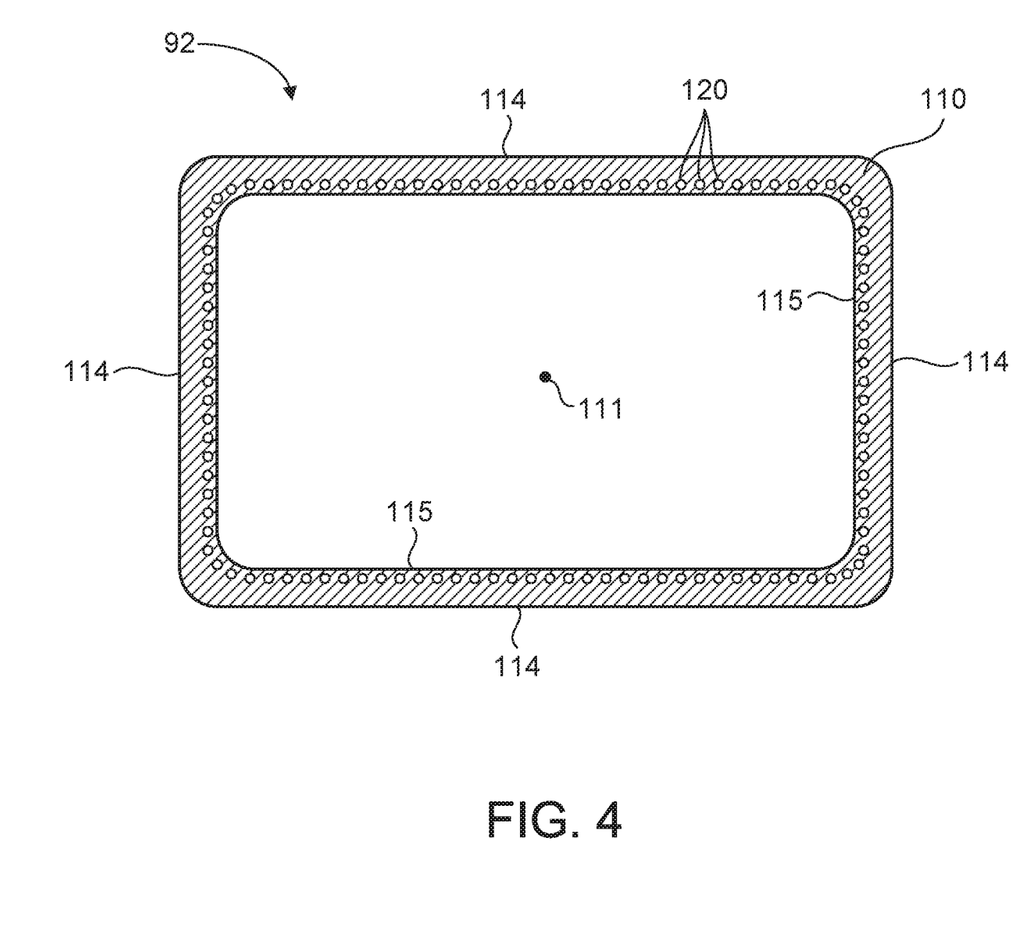
FIG. 4 illustrates a schematic view of the upstream facing surface of the aft frame assembly, according to an aspect of the present disclosure.

FIG. 4 illustrates a schematic view of the upstream facing surface 110 of aft frame 92. The upstream facing surface 110 includes a plurality of feed hole inlets 120 located thereon. Each of the feed hole inlets 120 is coupled to a cooling channel 122 (not shown in FIG. 4) that passes through the main body 100 and in a direction towards the radially inner facing surface 115. For example, one feed hole inlet 120 functions as the beginning of a respective cooling channel 122, so a plurality of feed hole inlets 120 correspond to an equal number of cooling channels 122. The source of air input to the feed hole inlets 120 is post-impingement cooling air drawn from between the transition duct/piece 72 and the outer sleeve 84, which is otherwise referred to as cooling annulus 86. The specific locations or configuration of the feed hole inlets and cooling channels may tailored to the specific application, so that thermal gradients in the aft frame are minimized or reduced. The radially inner facing surfaces 115 of the aft frame 92 are typically hotter than the radially outer surface 114, so the feed hole inlets 120 and respective cooling channels 122 may be located nearer to or close to the radially inner facing surface 115. The phrases "radially inner" and "radially outer" are used with respect to central origin point 111, which is a central point with respect to aft frame 92.

Figure 5:
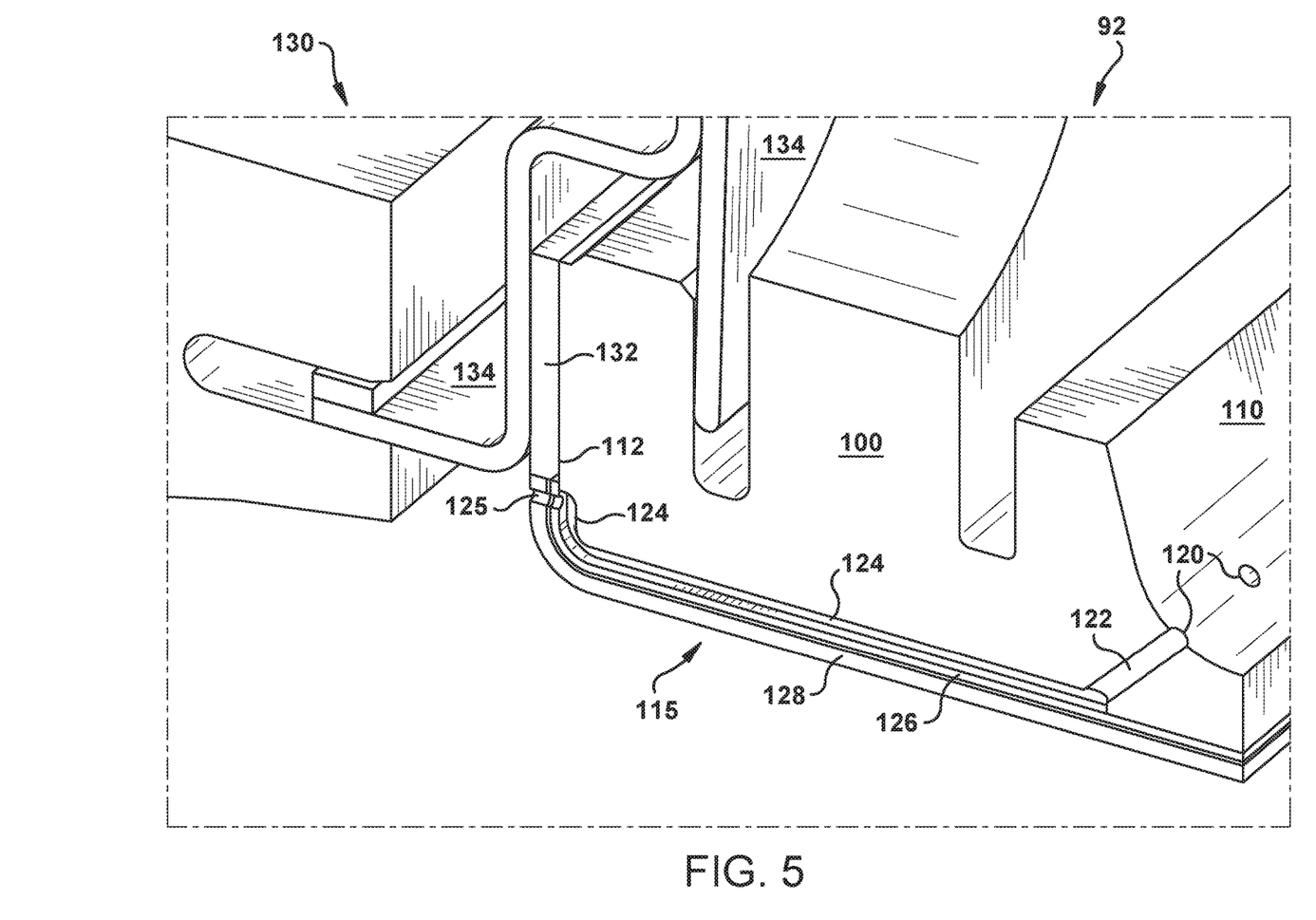
FIG. 5 illustrates a partial, perspective and cross-sectional view of the aft frame, according to an aspect of the present disclosure.

FIG. 5 illustrates a partial, perspective and cross-sectional view of the aft frame 92, according to an aspect of the present disclosure. The feed hole inlets 120 are located on the upstream facing surface 110, and each feed hole inlet 120 is connected to a cooling channel 122. The cooling channels 122 pass through the main body 100 of the aft frame and extend towards the radially inner facing surface 115. The cooling channels 122 may pass straight or axially through the main body, or may be angled with respect to an axial line passing through central origin point 111. The term "axial" is with reference to the aft frame and is generally in the direction of the flow of combustion gasses. The term "radial" is any direction at right angles to the axial direction. An advantage of the present configuration is that the cooling channels 122 may be relatively short, and this enables the cooling air to rapidly reach the radially inner surface areas of the aft frame and provide cooling where it is needed. The cooling channels 122 are connected to and terminate (or exhaust into) microchannels 124. One cooling channel 122 may be connected to one microchannel 124. This configuration is advantageous, because it minimizes or reduces the adverse effects of clogging of the microchannels. If one cooling channel or microchannel becomes clogged (or otherwise obstructed) the other cooling channels and microchannels will continue to provide cooling airflow to the aft frame.

Each microchannel 124 is formed in or near the radially inner facing surface 112, and extends at least partially along the downstream facing surface 112. The microchannel cooling slots may have depths in the range from approximately 0.2 millimeters (mm) to approximately 3 mm, or 0.5 mm to 1 mm, or any subranges therebetween. Further, the microchannels 124 may have widths in the range from approximately 0.2 mm to approximately 3 mm, or 0.5 mm to 1 mm, or any subranges therebetween. The length of each microchannel 124 will vary based on the distance from the cooling channel 122 outlet to the exit of the microchannel on the downstream facing surface or the radially outer facing surface 114 of the aft frame. For example, the microchannels 124 may exit at exit hole 125, and exit hole 125 may be located on the downstream facing surface 112 (as shown) and/or on the radially outer facing surface 114. The aft frame 92 is typically located immediately upstream of a stage 1 nozzle 130. A wear strip 132 and seal 134 may be interposed between the nozzle 130 and aft frame 92.

The microchannel cooling slots 124 may be covered by a pre-sintered preform 126. The base alloy of the pre-sintered preform 126 can comprise any composition such as one similar to the main body 100 to promote common physical properties between the pre-sintered preform 126 and the main body 100. For example, in some embodiments, the base alloy and the main body share a common composition (i.e., they are the same type of material). In some embodiments, the base alloy can comprise nickel-based superalloys or cobalt-based superalloys. In some embodiments, the properties for the base alloy include chemical and metallurgical compatibility with the main body 100. The exit holes 125 will also pass through the pre-sintered preform 126. A thermal barrier coating 128 may be formed on the pre-sintered preform, and in some applications the presence of the thermal barrier coating 128 is a preferred embodiment. A thermal barrier coating (TBC) reduces the temperature of the underlying component substrate and thereby prolongs the service life of the component. Ceramic materials and particularly yttria-stabilized zirconia (YSZ) are widely used as TBC materials because of their high temperature capability, low thermal conductivity, and relative ease of deposition by plasma spraying, flame spraying and physical vapor deposition (PVD) techniques.

Figure 6:
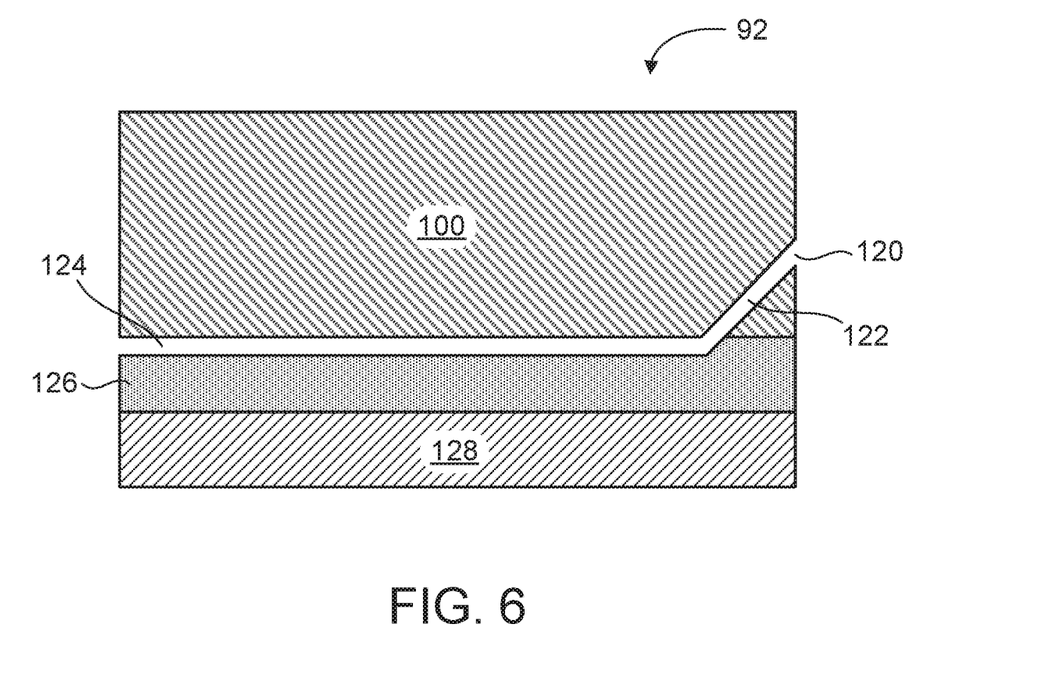
FIG. 6 illustrates a partial, schematic cross-sectional view of the aft frame 92, according to an aspect of the present disclosure.

FIG. 6 illustrates a partial, schematic cross-sectional view of the aft frame 92, according to an aspect of the present disclosure. The microchannels 124 may be formed in the pre-sintered preform 126. The feed hole inlet 120 functions as the input to cooling channel 122, and the cooling channel 122 passes through main body 100 to the microchannel 124 located in the pre-sintered preform 126. This configuration may simplify aft frame fabrication as it may be easier to form microchannels in the pre-sintered preform 126 layer by using near net shape or metal printing (e.g., additive manufacturing) approaches. The microchannels may be formed in the main body 100 (as shown in FIG. 5), or in the pre-sintered preform 126 adjacent to the main body 100 (as shown in FIG. 6). Furthermore, the microchannel cooling slots 124 may be configured to be straight, curved or serpentine, to obtain the desired degree of cooling of the aft frame.

Figure 7:
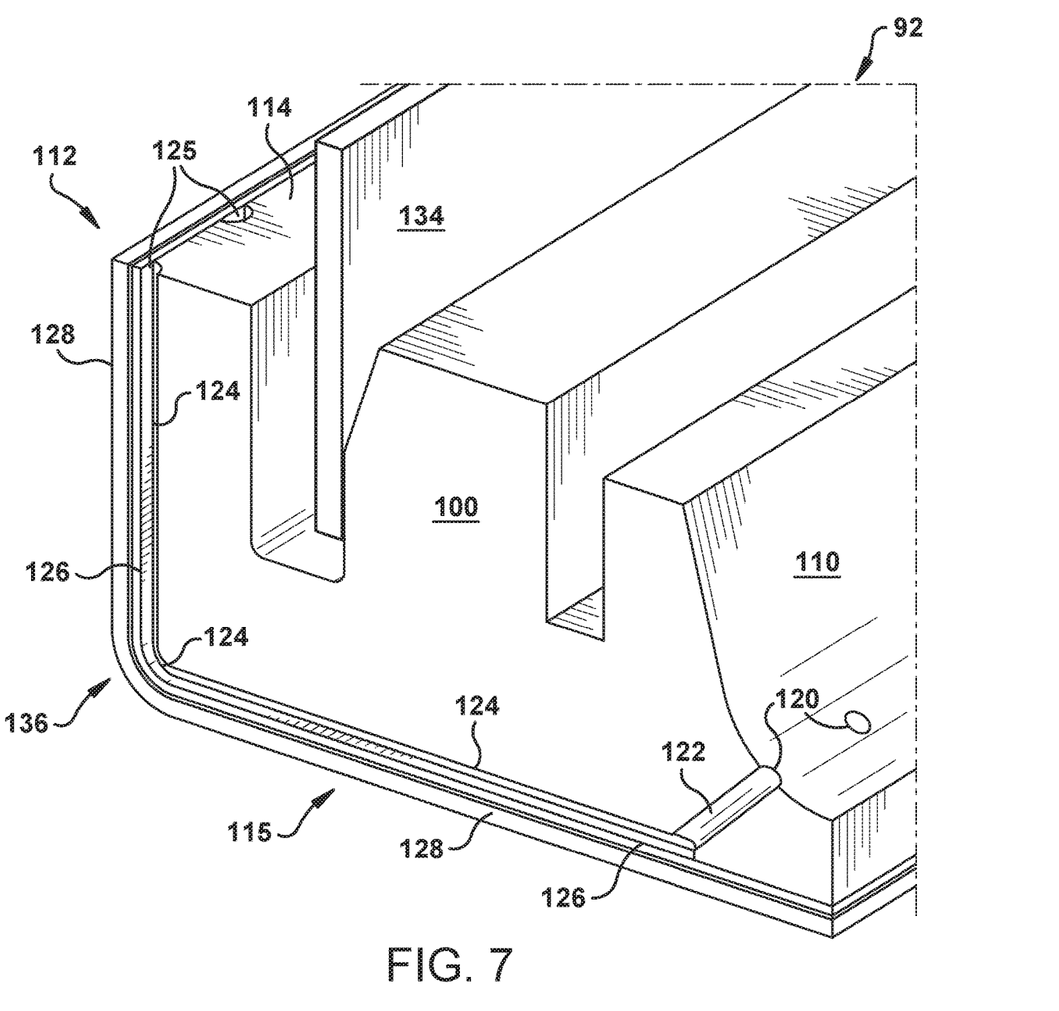
FIG. 7 illustrates a partial, perspective and cross-sectional view of the aft frame, according to an aspect of the present disclosure.

FIG. 7 illustrates a partial, perspective and cross-sectional view of the aft frame 92, according to an aspect of the present disclosure. The microchannels extend along the radially inner facing surface 115, then go around the corner 136 and continue up the downstream facing surface 112. The corner 136 tends to be one of the hotter areas of the aft frame 92, so the near flow path cooling provided by microchannels 124 should be very effective. The microchannels 124 may exit on the downstream facing surface 112 (not shown in FIG. 7) and/or on the radially outer facing surface 114 (as shown). The specific location of the microchannels will be selected based on cooling needs of the aft frame and thermal gradient reduction objectives. The microchannels 124 can extend circumferentially around the downstream side of the aft frame, in the corners, or only in just specific portions thereof.

Figure 8:
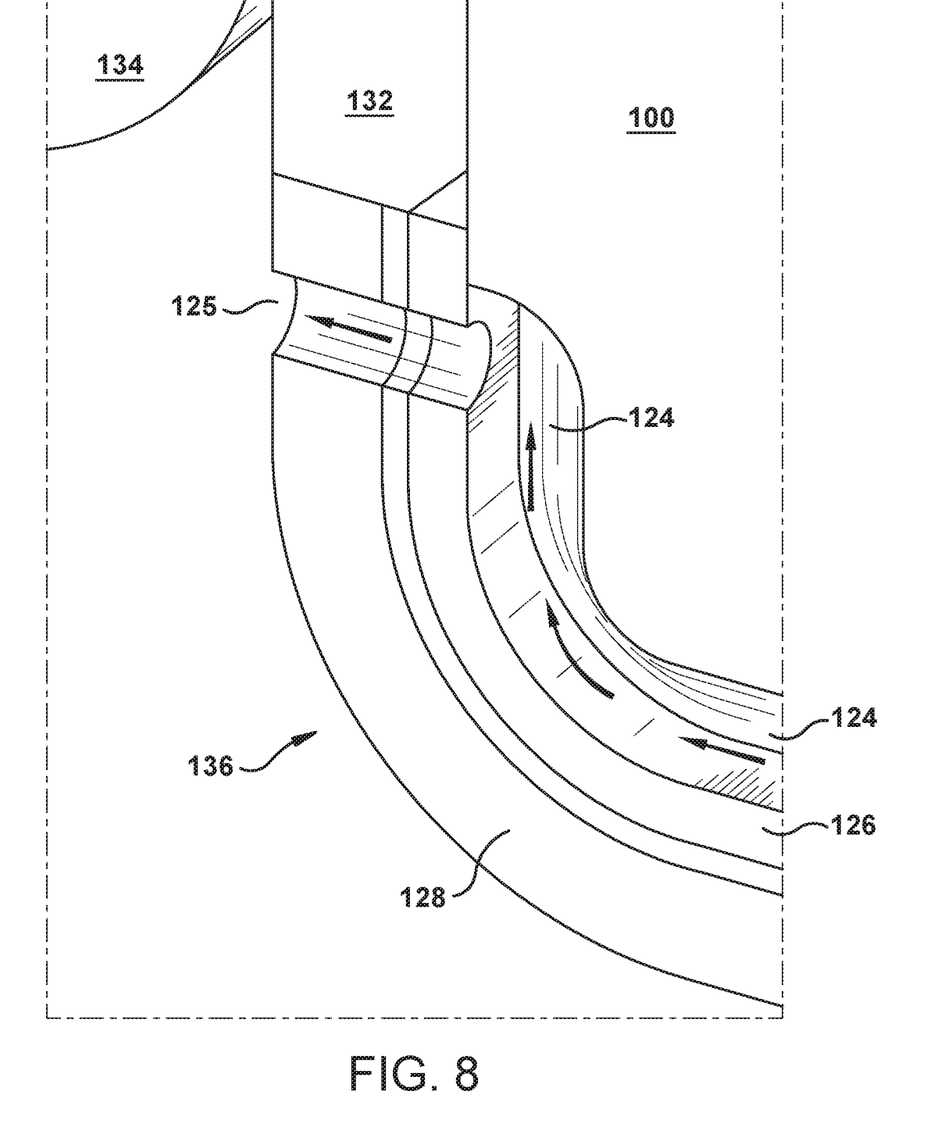
FIG. 8 illustrates a partial, enlarged perspective and cross-sectional view of the corner section of the aft frame, according to an aspect of the present disclosure.

FIG. 8 illustrates a partial, enlarged perspective and cross-sectional view of the corner section of aft frame 92, according to an aspect of the present disclosure. The corners 136 of the aft frame join the radially inner facing surfaces and the downstream facing surfaces. As mentioned previously, these corner areas tend to be some of the hotter areas of the aft frame, and in the most need of cooling. The microchannel 124 can easily conform to the corner shape and provide an excellent near flow path cooling in these areas. In the past, corners of aft frames have been very difficult to cool effectively. The microchannels herein described solve this problem.

Figure 9:
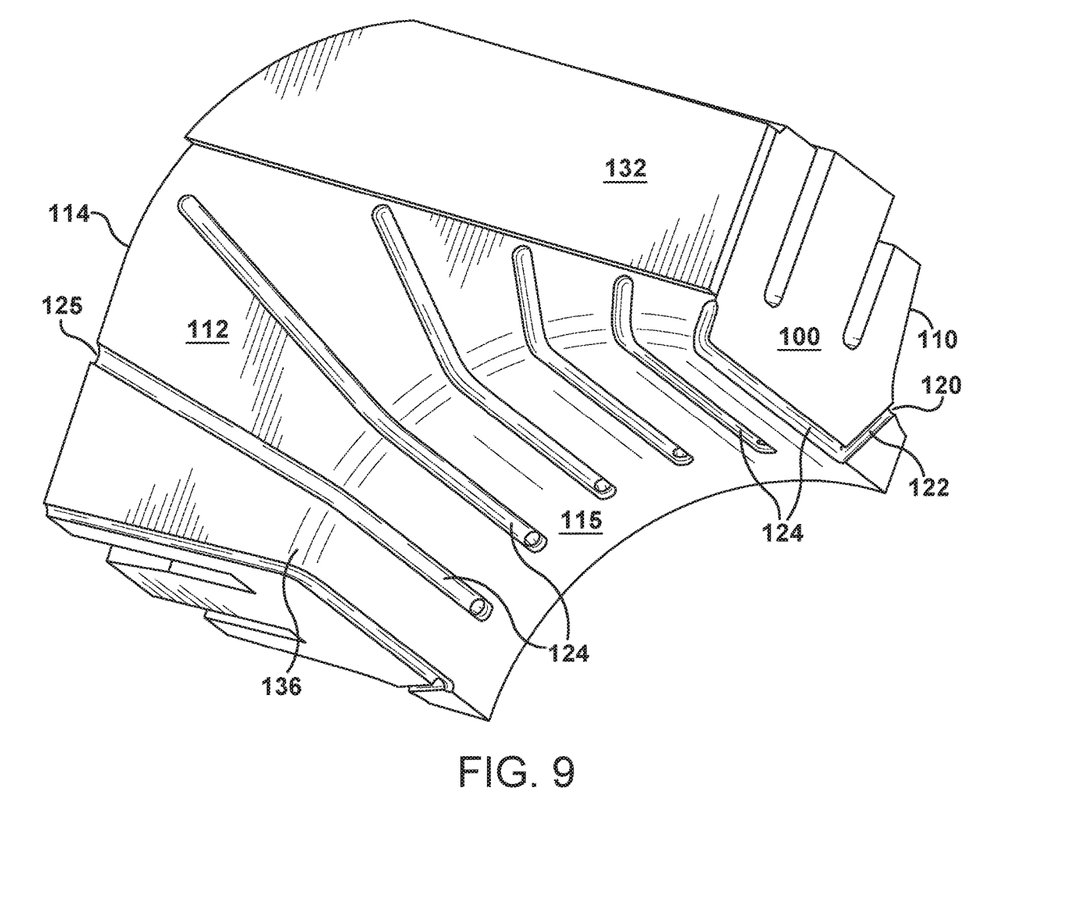
FIG. 9 illustrates a partial, perspective view of a corner section of the aft frame, according to an aspect of the present disclosure.

FIG. 9 illustrates a partial, perspective view of a corner section of the aft frame 92, according to an aspect of the present disclosure. The microchannels 124 extend along radially inner facing surface 115, curve around corner 136 and continue along downstream facing surface 112. The microchannels exit on radially outer facing surface 114 or on the downstream facing surface 112. This configuration of the microchannels allows for near flow path cooling to extend to the top edge of the side rails, and permit exit holes (not shown) to be aimed at the downstream hot gas path components for cooling. The pre-sintered preform and thermal barrier coating layers are omitted for clarity. It may also be seen that the circumferential spacing of the microchannels 124 may vary based on desired cooling needs. For example, the microchannels 124 on the radially inner facing surface are relatively evenly spaced, but as the microchannels extend radially outward (along downstream facing surface 112) the spacing between adjacent microchannels varies based on circumferential location or the exit holes and/or the microchannels. The exit holes 125 are located at the ends of each microchannel. An advantage to exhausting cooling air out of the side rails is that the temperature of the hot gas may be reduced between adjacent transition pieces, which will reduce thermal stresses and improve longevity and durability of the transition pieces and associated components.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An aft frame assembly for a gas turbine transition piece, the aft frame assembly comprising:
   a main body comprising an upstream facing surface, a downstream facing surface, a radially outer facing surface and a radially inner facing surface;
   a corner disposed between the radially inner facing surface and the downstream facing surface;
   a plurality of feed hole inlets located on the upstream facing surface, each of the plurality of feed hole inlets coupled to one of a plurality of cooling channels passing through the main body towards the radially inner facing surface;
   a plurality of microchannels formed near the radially inner facing surface and extending substantially axially along the radially inner facing surface and substantially radially along the downstream facing surface, wherein the plurality of microchannels curve around the corner, the plurality of cooling channels connected to and terminating in the plurality of microchannels; and
   a pre-sintered preform located on the radially inner facing surface of the main body.

2. The aft frame assembly of claim 1, the plurality of microchannels formed in the main body.

3. The aft frame assembly of claim 2, wherein each microchannel of the plurality of microchannels exits in a respective exit hole located on the downstream facing surface or the radially outer facing surface.

4. The aft frame assembly of claim 1, a thermal barrier coating formed on the pre-sintered preform.

5. The aft frame assembly of claim 4, wherein a circumferential distance between two adjacent microchannels of the plurality of microchannels varies in a radially outward direction based on a circumferential location of each of the two adjacent microchannels of the plurality of microchannels within the aft frame.

6. The aft frame assembly of claim 1, the plurality of microchannels formed in the pre-sintered preform.

7. The aft frame assembly of claim 6, wherein each microchannel of the plurality of microchannels exits in a respective exit hole located on the downstream facing surface or the radially outer facing surface.

8. The aft frame assembly of claim 7, wherein a circumferential distance between two adjacent microchannels of the plurality of microchannels varies in a radially outward direction based on a circumferential location of each of the two adjacent microchannels of the plurality of microchannels within the aft frame.

9. A transition piece assembly having an aft frame assembly, the aft frame assembly comprising:
 a main body comprising an upstream facing surface, a downstream facing surface, a radially outer facing surface and a radially inner facing surface;
 a corner disposed between the radially inner facing surface and the downstream facing surface;
 a plurality of feed hole inlets located on the upstream facing surface, each of the plurality of feed hole inlets coupled to one of a plurality of cooling channels passing through the main body towards the radially inner facing surface;
 a plurality of microchannels formed near the radially inner facing surface and extending substantially axially along the radially inner facing surface and substantially radially along the downstream facing surface wherein the plurality of microchannels curve around the corner, the plurality of cooling channels connected to and terminating in the plurality of microchannels;
 a pre-sintered preform located on the radially inner facing surface of the main body; and
 wherein the plurality of microchannels are formed in the main body or the pre-sintered preform.

10. The transition piece assembly of claim 9, wherein each microchannel of the plurality of microchannels exits in respective exit hole located on the downstream facing surface or the radially outer facing surface.

11. The transition piece assembly of claim 9, a thermal barrier coating formed on the pre-sintered preform.

12. The transition piece assembly of claim 11, wherein a circumferential distance between two adjacent microchannels of the plurality of microchannels varies in a radially outward direction based on a circumferential location of each of the two adjacent microchannels microchannels of the plurality of microchannels within the aft frame.

13. A gas turbine comprising:
 a compressor;
 a combustion section disposed downstream from the compressor, the combustion section being in fluid communication with the compressor;
 a turbine disposed downstream from the combustion section;
 the combustion section comprising an aft frame assembly having a main body, the main body comprising:
  an upstream facing surface, a downstream facing surface, a radially outer facing surface and a radially inner facing surface;
  a corner disposed between the radially inner facing surface and the downstream facing surface;
 a plurality of feed hole inlets located on the upstream facing surface, each of the plurality of feed hole inlets coupled to one of a plurality of cooling channels passing through the main body towards the radially inner facing surface;
 a plurality of microchannels formed near the radially inner facing surface and extending substantially axially along the radially inner facing surface and substantially radially along the downstream facing surface, wherein the plurality of microchannels curve around the corner, the plurality of cooling channels connected to and terminating in the plurality of microchannels;
 a pre-sintered preform located on the radially inner facing surface of the main body; and
 wherein the plurality of microchannels are formed in the main body or the pre-sintered preform.

14. The gas turbine of claim 13, wherein each microchannel of the plurality of microchannels exits in a respective exit hole located on the downstream facing surface or the radially outer facing surface.

15. The gas turbine of claim 13, a thermal barrier coating formed on the pre sintered preform.

16. The gas turbine of claim 15, wherein a circumferential distance between two adjacent microchannels of the plurality of microchannels varies in a radially outward direction based on a circumferential location of each of the two adjacent microchannels of the plurality of microchannels within the aft frame.

17. The aft frame assembly of claim 1, wherein the plurality of microchannels have a constant depth and a constant width.

* * * * *